United States Patent [19]

Leep et al.

[11] Patent Number: 5,100,326

[45] Date of Patent: Mar. 31, 1992

[54] FLASH CARDS FOR TEACHING AND PRACTICING BLACKJACK

[76] Inventors: J. B. Leep; Carol Martin, both of 441 S. Sierra Av. #207, Solana Beach, Calif. 92075

[21] Appl. No.: 586,266

[22] Filed: Sep. 21, 1990

[51] Int. Cl.⁵ .......................... G09B 19/22; A63F 1/00
[52] U.S. Cl. .................................. 434/129; 273/292; 273/296; 273/302
[58] Field of Search ................ 434/129, 199, 348, 169, 434/198, 251, 193, 322; 273/292, 293, 296, 302-307

[56] References Cited

U.S. PATENT DOCUMENTS

| | | |
|---|---|---|
| 855,681 | 6/1907 | Ward ................................. 273/292 |
| 1,246,152 | 11/1917 | Perrine . |
| 1,322,204 | 11/1919 | Schuchard ........................ 273/307 |
| 1,327,019 | 1/1920 | Britton . |
| 1,354,707 | 10/1920 | Waterhouse ..................... 273/296 X |
| 2,042,930 | 6/1936 | Emmerich ......................... 273/296 |
| 2,535,849 | 12/1950 | Grace . |
| 3,143,348 | 8/1964 | Carsen et al. . |
| 3,562,923 | 2/1971 | Chuy et al. . |
| 3,689,071 | 9/1972 | Kucera ............................ 434/129 X |
| 3,731,399 | 5/1973 | Gordy et al. . |
| 3,780,451 | 12/1973 | White . |
| 3,924,340 | 12/1975 | Tammone . |
| 3,962,800 | 6/1976 | Feldheim ......................... 434/129 |
| 4,014,549 | 3/1977 | Cywar . |
| 4,029,320 | 6/1977 | Hausman . |
| 4,053,994 | 10/1977 | Gess . |
| 4,112,592 | 9/1978 | DeCastro Basto . |
| 4,298,200 | 11/1981 | Kanbar . |
| 4,436,324 | 3/1984 | Barton ............................. 434/129 X |
| 4,662,652 | 5/1987 | Hargis . |

FOREIGN PATENT DOCUMENTS 535269  4/1941  United Kingdom ................ 273/306

OTHER PUBLICATIONS

Ken Uston, *Million Dollar Blackjack*, 1981, p. 124B, Showing Flash Cards.

V. R. Clavel, "Flash Jack", 1986, Samples of Flash Ards.

Primary Examiner—Richard J. Apley
Assistant Examiner—Linda C. M. Dvorak

[57] ABSTRACT

Improved flash cards for teaching and practicing the game of blackjack. Each flash card has two playing situations presented in separate sections (10 and 23) on its front side, in opposing orientations and at opposing ends of the card. In each section, the playing cards held by the player are represented as two or more overlapping images (11 and 12) of portions of playing cards. The dealer's card is a smaller image (16) of a playing card in perspective, within a frame (14) which overlaps the image of one of the player's cards. The recommended action (42) for a player to take when presented with each situation and the rule (44) governing how to play in each situation are printed in similar sections (40 and 50) on the back of each flash card. Identifiers (18 and 46) appear on each side of the flash card to indicate a group of flash cards to which the card belongs, and the sequence of the card within that group.

11 Claims, 7 Drawing Sheets

Flashcards For Uston Advanced Point Count
(continued)

| 10 16 (0) | A 16 (+10) | 2 15 (−7) |
| --- | --- | --- |
| 3 15 (−8) | 4 15 (−10) | 5 15 (−13) |
| 6 15 (−12) | 7 15 (+20) | 8 15 (+23) |
| 9 15 (+11) | 10 15 (+4) | A 15 (+12) |

FLASH JACK™

HARD HAND

DEALER'S UP CARD:
2 or 3

PLAYER'S HAND:
5 thru 8

DO YOU:
STAND?
HIT?
DOUBLE DOWN?

©1986 V. R. Clavel                    (Over)

---

DECISION: HIT

STAND ON HARD TOTALS OF 13 OR SOFT TOTALS OF 18 OR BETTER.

CALCULATIONS SHOW ODDS ARE BETTER BY STANDING ON HARD TOTALS OF 13 AGAINST DEALER'S UP CARD OF 2 OR 3.

DEALER MUST DRAW TO MAKE REQUIRED HAND OF 17 OR BETTER; AND WITH SMALL AND HIGHLY BREAKABLE UP CARDS, IS VERY LIKELY TO BUST.

HH-1

---

FLASH JACK™

PAIR

DEALER'S UP CARD:
8 thru Ace

PLAYER'S HAND:
7-7

DO YOU:
STAND?
HIT?
SPLIT?
DOUBLE DOWN?

©1986 V. R. Clavel                    (Over)

---

DECISION: HIT

DEALER HAS HIGH AND FAVORABLE UP CARDS WITH CHANCES OF HAVING A VERY GOOD STANDING HAND.

STAND ON HARD TOTALS OF 17 OR BETTER.

Listing of Printed Information for "Hit-Stand" Flash Cards

| Card Section | | Player Cards | | | Up Card | Recommended Action | Governing Rule |
|---|---|---|---|---|---|---|---|
| ID | End | 1st | 2nd | 3rd | | | |
| H1 | Upper | 7 | 5 | | 2 | HIT 12 vs 2 | Stand on 12 vs 4-6, otherwise hit |
|  | Lower | 2 | 4 | 6 | 3 | HIT 12 vs 3 | |
| H2 | Upper | 2 | 10 | | 4 | STAND on 12 vs 4 | |
|  | Lower | 4 | 8 | | 6 | STAND on 12 vs 6 | |
| H3 | Upper | J | 2 | | 8 | HIT 12 vs 8 | |
|  | Lower | 10 | 3 | | 2 | STAND on 13 vs 2 | Stand on 13 vs 2-6, otherwise hit |
| H4 | Upper | 3 | 4 | 6 | 5 | STAND on 13 vs 5 | |
|  | Lower | 5 | 8 | | 7 | HIT 13 vs 7 | |
| H5 | Upper | K | 4 | | 3 | STAND on 14 vs 3 | Stand on 14 vs 2-6, otherwise hit |
|  | Lower | 6 | 8 | | 6 | STAND on 14 vs 6 | |
| H6 | Upper | 9 | 4 | A | 9 | HIT 14 vs 9 | |
|  | Lower | Q | 5 | | 4 | STAND on 15 vs 4 | Stand on 15 vs 2-6, otherwise hit |
| H7 | Upper | 7 | 8 | | A | HIT 15 vs A | |
|  | Lower | 9 | 7 | | 2 | STAND on 16 vs 2 | Stand on 16 vs 2-6, otherwise hit |
| H8 | Upper | 6 | 6 | 4 | 8 | HIT 16 vs 8 | |
|  | Lower | K | 3 | 3 | J | HIT 16 vs 10 | |

*Fig 9*

Listing of Printed Information for "Double" Flash Cards

| Card Section | | Player Cards | | | Up Card | Recommended Action | Governing Rule |
|---|---|---|---|---|---|---|---|
| ID | End | 1st | 2nd | 3rd | | | |
| D1 | Upper | 4 | 4 | | 3 | HIT 4's vs 3 | Think of 4,4 as an 8, Always hit 8 or less |
| | Lower | 5 | 3 | | 6 | HIT 8 vs 6 | Always hit 8 or less |
| D2 | Upper | 2 | 6 | | 7 | HIT 8 vs 7 | |
| | Lower | 4 | 5 | | 2 | HIT 9 vs 2 | Double 9 vs 3-6, otherwise hit |
| D3 | Upper | 6 | 3 | | 3 | DOUBLE 9 vs 3 | |
| | Lower | 2 | 7 | | 5 | DOUBLE 9 vs 5 | |
| D4 | Upper | 4 | 2 | 3 | 7 | HIT 9 vs 7 | |
| | Lower | 7 | 3 | | 2 | DOUBLE 10 vs 2 | Double 10 vs 2-9, otherwise hit |
| D5 | Upper | 4 | 6 | | 6 | DOUBLE 10 vs 6 | |
| | Lower | 2 | 8 | | 9 | DOUBLE 10 vs 9 | |
| D6 | Upper | 5 | 5 | | K | HIT 10 vs 10 | 5,5 is always a 10! Double 10 vs 2-9, otherwise hit |
| | Lower | 7 | 4 | | 3 | DOUBLE 11 vs 3 | Double 11 vs 2-10, otherwise hit |
| D7 | Upper | 3 | 8 | | 7 | DOUBLE 11 vs 7 | |
| | Lower | 9 | 2 | | J | DOUBLE 11 vs 10 | |
| D8 | Upper | 5 | 6 | | A | HIT 11 vs A | |
| | Lower | A | 2 | | 4 | HIT A2 vs 4 | Double A2 vs 5 or 6, otherwise hit |
| D9 | Upper | 2 | A | | 5 | DOUBLE A2 vs 5 | |
| | Lower | 2 | A | | 7 | HIT A2 vs 7 | |
| D10 | Upper | 3 | A | | 4 | HIT A3 vs 4 | Double A3 vs 5 or 6, otherwise hit |
| | Lower | A | 3 | | 5 | DOUBLE A3 vs 5 | |
| D11 | Upper | 2 | A | A | 8 | HIT A3 vs 8 | |
| | Lower | A | 3 | A | 3 | HIT A4 vs 3 | Double A4 vs 4-6, otherwise hit |
| D12 | Upper | 4 | A | | 4 | DOUBLE A4 vs 4 | |
| | Lower | A | 4 | | Q | HIT A4 vs 10 | |
| D13 | Upper | 5 | A | | 3 | HIT A5 vs 3 | Double A5 vs 4-6, otherwise hit |
| | Lower | A | 5 | | 5 | DOUBLE A5 vs 5 | |
| D14 | Upper | 2 | 3 | A | 6 | HIT A5 (2,3,A) vs 6 | |
| | Lower | A | 4 | A | 9 | HIT A5 vs 9 | |
| D15 | Upper | A | 6 | | 2 | HIT A6 vs 2 | Double A6 vs 3-6, otherwise hit |
| | Lower | 6 | A | | 3 | DOUBLE A6 vs 3 | |
| D16 | Upper | 6 | A | | 6 | DOUBLE A6 vs 6 | |
| | Lower | 2 | 4 | A | 6 | HIT A6 (2,4,A) vs 6 | |
| D17 | Upper | 6 | A | | 7 | HIT A6 vs 7 | |
| | Lower | A | 3 | 3 | A | HIT A6 vs A | |
| D18 | Upper | A | 7 | | 2 | STAND on A7 vs 2 | Double A7 vs 3-6, stand on A7 vs 2,7,8 hit A7 vs 9,10,A |
| | Lower | A | 7 | | 3 | DOUBLE A7 vs 3 | |
| D19 | Upper | A | 7 | | 6 | DOUBLE A7 vs 6 | |
| | Lower | A | 7 | | 8 | STAND on A7 vs 8 | |
| D20 | Upper | 2 | 5 | A | 9 | HIT A7 vs 9 | |
| | Lower | 7 | A | | 10 | HIT A7 vs 10 | |
| D21 | Upper | A | 6 | A | A | HIT A7 vs A | |
| | Lower | 4 | 4 | A | 3 | STAND on A8 vs 3 | |
| D22 | Upper | A | 8 | | 6 | STAND on A8 vs 6 | Always stand on A8 |
| | Lower | 9 | A | | 5 | STAND on A9 vs 5 | Always stand on A9 |

*Fig 10*

Listing of Printed Information for "Pair" Flash Cards

| Card Section | | Player Cards | | | Up Card | Recommended Action | Governing Rule |
|---|---|---|---|---|---|---|---|
| ID | End | 1st | 2nd | 3rd | | | |
| P1 | Upper | 2 | 2 | | 3 | HIT 2's vs 3 | Split 2's vs 4-7, otherwise hit |
|    | Lower | 2 | 2 | | 4 | SPLIT 2's vs 4 | |
| P2 | Upper | 2 | 2 | | 7 | SPLIT 2's vs 7 | |
|    | Lower | 2 | 2 | | 8 | HIT 2's vs 8 | |
| P3 | Upper | 3 | 3 | | 2 | HIT 3's vs 2 | Split 3's vs 4-7, otherwise hit |
|    | Lower | 3 | 3 | | 4 | SPLIT 3's vs 4 | |
| P4 | Upper | 3 | 3 | | 7 | SPLIT 3's vs 7 | |
|    | Lower | 3 | 3 | | 9 | HIT 3's vs 9 | |
| P5 | Upper | 4 | 4 | | 5 | HIT 4's vs 5 | Think of 4,4 as an 8, always hit 8 or less |
|    | Lower | 4 | 4 | | 8 | HIT 4's vs 8 | |
| P6 | Upper | 5 | 5 | | 6 | DOUBLE 10 vs 6 | 5,5 is always a 10! |
|    | Lower | 5 | 5 | | 2 | DOUBLE 10 vs 2 | Double 10 vs 2-9, otherwise hit |
| P7 | Upper | 6 | 6 | | 2 | HIT 6's vs 2 | Split 6's vs 3-6, otherwise hit |
|    | Lower | 6 | 6 | | 3 | SPLIT 6's vs 3 | |
| P8 | Upper | 6 | 6 | | 6 | SPLIT 6's vs 6 | |
|    | Lower | 6 | 6 | | 7 | HIT 6's vs 7 | |
| P9 | Upper | 7 | 7 | | 2 | SPLIT 7's vs 2 | Split 7's vs 2-7, otherwise hit |
|    | Lower | 7 | 7 | | 7 | SPLIT 7's vs 7 | |
| P10 | Upper | 7 | 7 | | 8 | HIT 7's vs 8 | |
|     | Lower | 7 | 7 | | J | HIT 7's vs 10 | |
| P11 | Upper | 8 | 8 | | 2 | SPLIT 8's vs 2 | Always split 8's |
|     | Lower | 8 | 8 | | Q | SPLIT 8's vs 10 | |
| P12 | Upper | 9 | 9 | | 2 | SPLIT 9's vs 2 | Always split 9's, except stand on 9's vs 7,10,A |
|     | Lower | 9 | 9 | | 5 | SPLIT 9's vs 5 | |
| P13 | Upper | 9 | 9 | | 7 | STAND on 9's vs 7 | |
|     | Lower | 9 | 9 | | 8 | SPLIT 9's vs 8 | |
| P14 | Upper | 9 | 9 | | 9 | SPLIT 9's vs 9 | |
|     | Lower | 9 | 9 | | 10 | STAND on 9's vs 10 | |
| P15 | Upper | J | 10 | | 6 | STAND on 10's vs 6 | Always stand on 10's |
|     | Lower | A | A | | 10 | SPLIT A's vs 10 | Always split A's |

*Fig 11*

FLASH CARDS FOR TEACHING AND PRACTICING BLACKJACK

BACKGROUND

1. Field of Invention

This invention relates to flash cards, specifically to flash cards used for teaching and practicing how to play the game of blackjack.

2. Discussion of Prior Art

A common instructional aid for teaching and practicing educational material and games is the "flash card." A flash card is usually a rectangular card, sized so it can be held in the user's hand. A question or situation is printed on one side of the card. The answer to the question, or the action to be taken in the situation, is printed on the other side. Many cards are gathered together in a stack or deck, with all the sides on which the questions are printed facing up. The user views each one in sequence, first looking at the question side and then flipping it over to look at the answer side. The cards are then arranged in random order, or shuffled, so that the user never knows which one will come up next.

Flash cards are commonly used in elementary schools for the teaching of arithmetic. An arithmetical question is printed on the front, for example, "2+2=?". On the back is printed the answer, in this example, "4". Flash cards have also been created for teaching games, including blackjack.

The printing on flash cards is usually unidirectional, that is, the cards must be oriented right-side up be read correctly. Therefore, when stacked and shuffled, not only must they all be facing up, but in addition, their orientations must be consistent so that as each card is viewed and discarded, the next one is able to be viewed in a similar orientation. This restriction means that care must be taken when shuffling or otherwise mixing unidirectional cards to keep them oriented correctly. Such unidirectional cards sometimes have an unique mark or physical anomaly which facilitates proper orientation when stacking, such as a single notched or flattened corner.

There are card devices which do not have the unidirectional nature of the cards described above. A common example is standard playing cards used to play bridge, poker, or blackjack. The card faces are essentially the same when viewed right-side up or upside down, because the symbols and numbers on the faces are arranged symmetrically about a line drawn across the card from one side to the other. The nondirectional nature of playing cards facilitates shuffling of the cards because the orientation of the cards with respect to one another is not a factor, as long as they are stacked all facing the same direction.

Flash cards present a useful way to learn the game of blackjack, and have been produced heretofore. To play blackjack well, a player must know what play to make for each combination of dealer and player cards that can appear. Proper play for each situation can be described in words as a set of governing rules, such as "Always stand if you have a pair of tens." Approximately thirty rules are needed to describe all playing situations. Additional rules governing special playing situations may be added to increase playing accuracy, but with the disadvantage of increased difficulty of learning. Learning to play can be facilitated by the use of flash cards because there are many combinations of cards that are possible, and it is advantageous to be able to practice them in random order.

Figure 7:
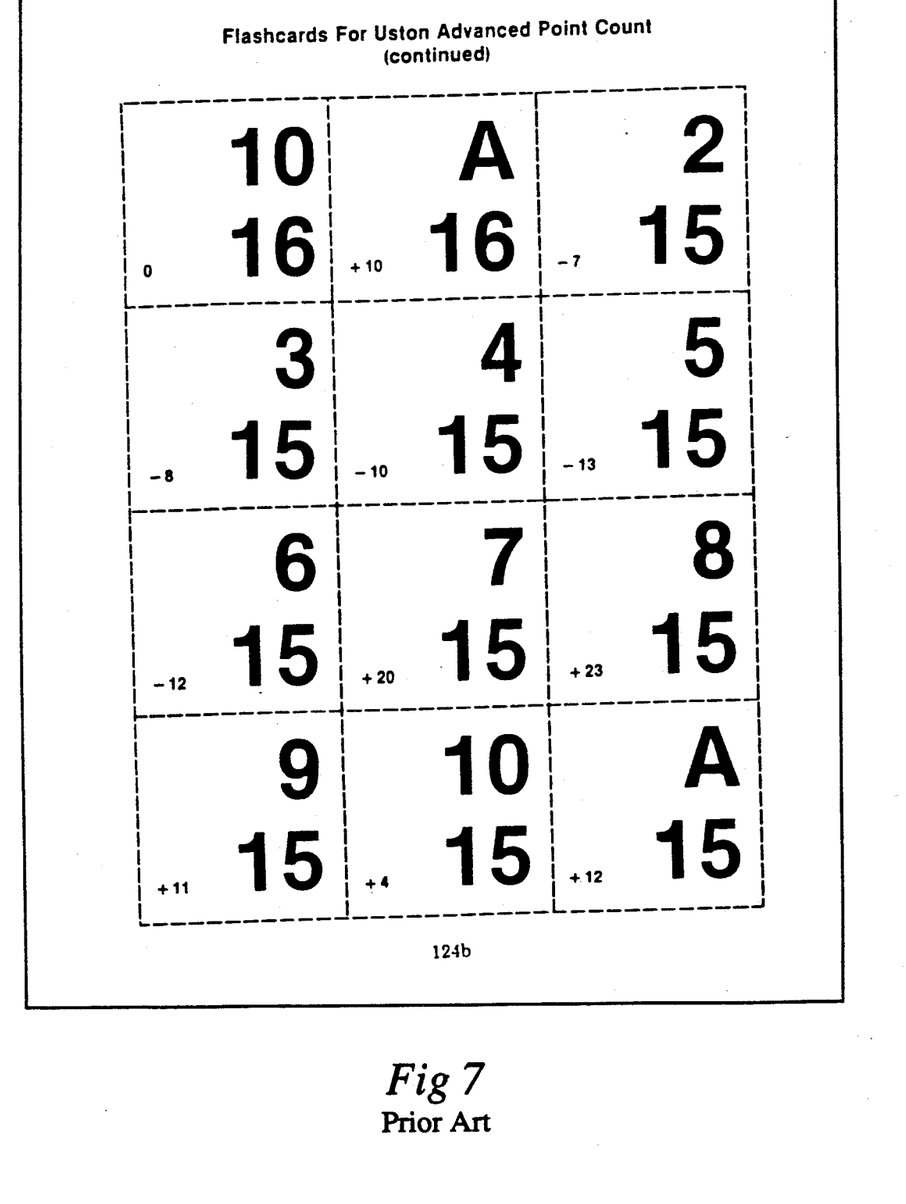
FIG. 7 shows a page of flash cards for blackjack from Ken Uston's book, *Million Dollar Blackjack*.
Figure 8:
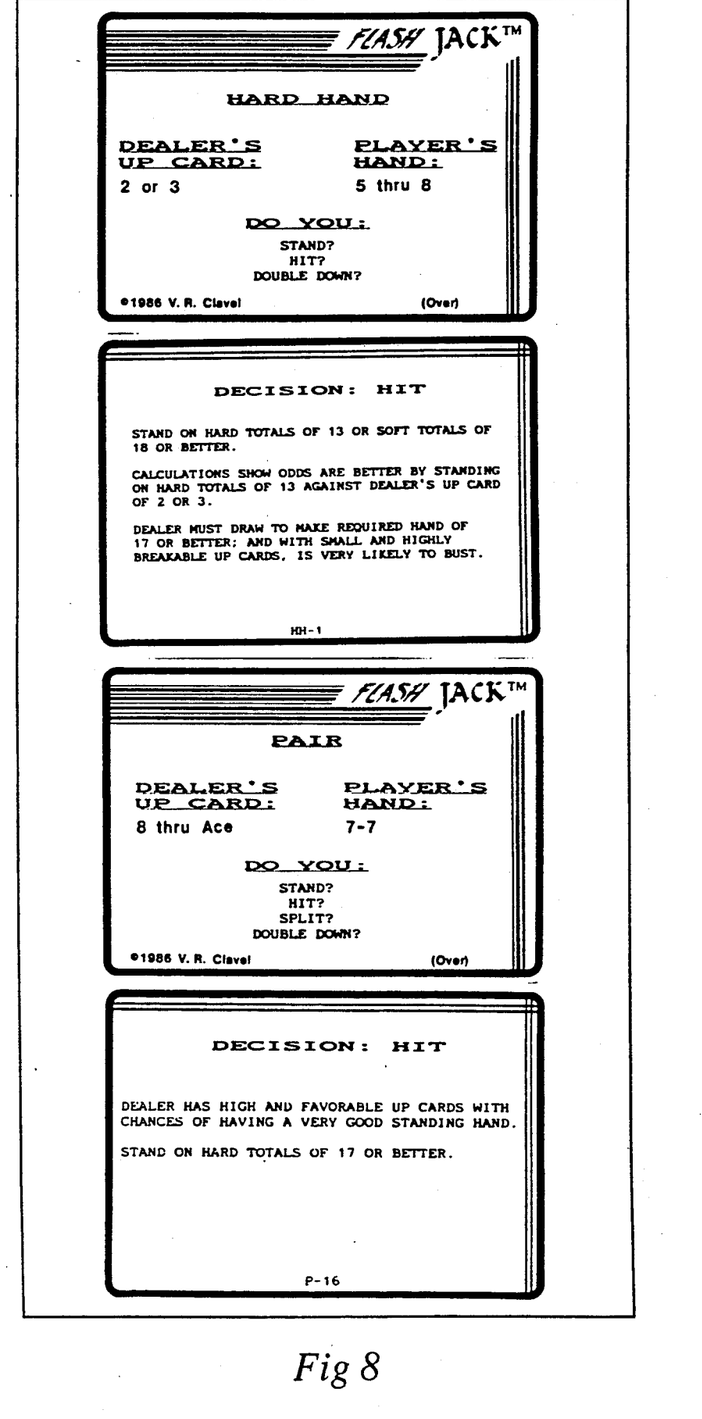
FIG. 8 shows two flash cards for blackjack from V. R. Clavel's product, Flash Jack.

In his book *Million Dollar Blackjack* (1981), Ken Uston presented a set of flash cards for learning how to play blackjack. These cards have subsequently been produced as a stand-alone product. A page from Mr. Uston's book is reproduced as FIG. 7. The flash cards are about 4 cm. square and are printed on the front only. They have numbers and letters in large print representing the playing cards belonging to the player and the dealer. The "answer" is a number in small print in the corner of the card. The player must learn the numbers corresponding to each combination of playing cards, and he uses this knowledge in optimizing his playing of the game. These flash cards have at least two deficiencies. First, they are unidirectional in nature, and therefore very inconvenient to shuffle. Moreover, the numbers and letters in large print are only representations of the values of the player's or dealer's cards. They do not depict the cards as they actually appear when held in the hand. The user must translate what the numbers or letters show into a visualization of the playing situation. This process of translation causes a delay in the learning process, and does not accurately simulate the playing situation.

Another blackjack flash card product is Flash Jack, initially manufactured by V. R. Clavel (1986). We purchased in the inventory, trademark, goodwill and all other rights of Flash Jack in August 1990. Flash Jack comprises a deck of cards which describe the playing situation in words on the front and which have the answers in words on the back. There is no pictorial representation whatsoever of the playing situation, and the cards are unidirectional. The information presented is overly complex and requires significant time and thought to assimilate.

U.S. Pat. No. 1,246,152 to Perrine (1917) discloses a pack of flash cards upon which are printed arithmetical problems, and presents a children's game for learning arithmetic. The problems are printed at opposing ends of the cards, so that the problem is visible right-side up at the top end of the card, no matter which end is held uppermost. However, when one flips the card over, the answer revealed on the back of the card is unidirectional. This implementation therefore limits the invention to a single problem per card, and limits the ease of shuffling the cards. This invention is directed primarily towards the minimization of the number of cards necessary to provide a complete exposition of all possible combinations in an area of arithmetical study, such as multiplication.

U.S. Pat. No. 3,731,399 to Gordy et al. (1973) discloses a pack of flash cards for teaching the game of bridge. It presents each hand of bridge on a set of four cards, one for each player in the game. The cards have a different hand at the opposing end of each card, thus presenting two hands in each set of four cards. The cards are specifically designed only for instruction in how to bid in the game of bridge. They have the deficiency that one cannot easily shuffle them, except as four separate decks. Moreover, they use numbers and letters to represent card faces and do not depict the card faces as they actually appear.

U.S. Pat. No. 4,014,549 to Cywar (1977) discloses a blackjack card deck. Each card has a number and suit printed in the corner to simulate one of the player's cards. The card has a chart summarizing the action a player should take depending on what other cards are present. The chart has the player's cards and the dealer's cards along its two axes. The cards are unidirectional, and therefore inconvenient to shuffle. Though the symbols in the corners of each card simulate the printing on a playing card, they do not substantially depict any actual playing card situation. The information presented on the card in chart form is relatively complex and difficult to interpret compared to similar charts portrayed in current blackjack literature.

In summary, flash cards heretofore known for the teaching and practicing of card games, and specifically blackjack, suffer from a number of disadvantages:

(a) The flash cards do not portray a true-to-life depiction of the player's and dealer's cards which the player would see when playing at a casino blackjack table. Instead, plain numbers or letters are used to represent the values of the visible cards. This inferior representation method delays the learning process by forcing the user to translate the numbers or letters into a mental image of the cards being played.

(b) The flash cards are unidirectional in nature, preventing easy shuffling, as is possible with a standard deck of playing cards.

(c) The information on the cards is frequently complex. Complexity deters the user from learning and practicing quickly.

(d) There exists no simple means for accurately representing multiple-card combinations in the player's hand.

OBJECTS AND ADVANTAGES

Accordingly, several objects and advantages of the present invention are as follows:

(a) to provide a method of pictorial representation of playing cards on flash cards which will facilitate and expedite the comprehension of card combination situations in the game of blackjack;

(b) to provide a method of pictorial representation of playing cards on flash cards which will present a more accurate simulation of the activity of playing the game of blackjack than provided by the current art;

(c) to provide a method of arranging information on flash cards which will enable ease of shuffling of the flash cards.

Further objects and advantages will become apparent from a consideration of the ensuing description and drawings.

DESCRIPTION OF DRAWINGS

FIGS. 9, 10 and 11 show a listing of the information which would be printed on a preferred embodiment of a blackjack learning product based on the current invention.

LIST OF REFERENCE NUMERALS

| | |
|---|---|
| 10 Upper section of front of card | 26 Revealed portion of player's second card |
| 11 Revealed portion of player's first card | 28 Revealed portion of player's third card |
| 12 Revealed portion of player's second card | 30 Elliptical frame for view of dealer's up card |
| 13 Line simulating the edge of card portion | 32 Dealer's up card, in distant perspective |
| 14 Elliptical frame for view of dealer's up card | 40 Upper section of back of card |
| 16 Dealer's up card, in distant perspective | 42 Recommended action to take |
| 18 Card identification number | 44 Governing rule for action |
| 20 Central region for manufacturer's logo | 46 Card identification number |
| 22 Manufacturer's logo | 48 Manufacturer's logo |
| 23 Lower section of front of card | 50 Lower section of back of card |
| 24 Revealed portion of player's first card | 52 Decorative design for back of card |
| | 60-76 Additional card examples |

DESCRIPTION OF INVENTION

Figure 1:
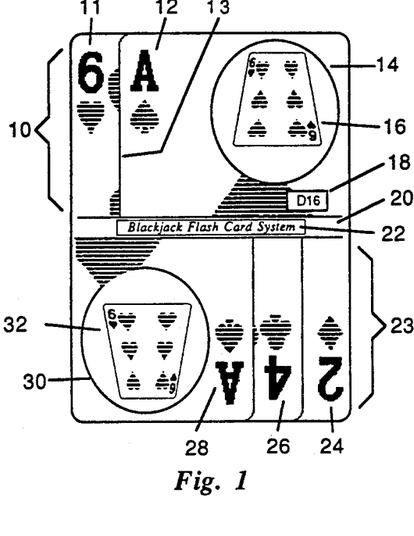
FIGS. 1 and 2 show the front and back, respectively, of a flash card for teaching and practicing blackjack.
Figure 2:
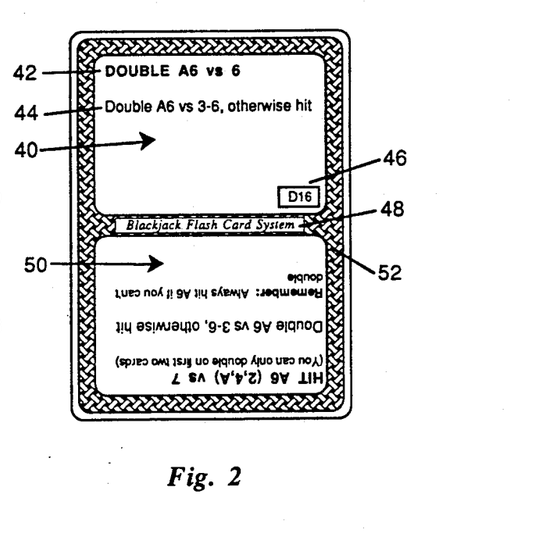
Figure 3:
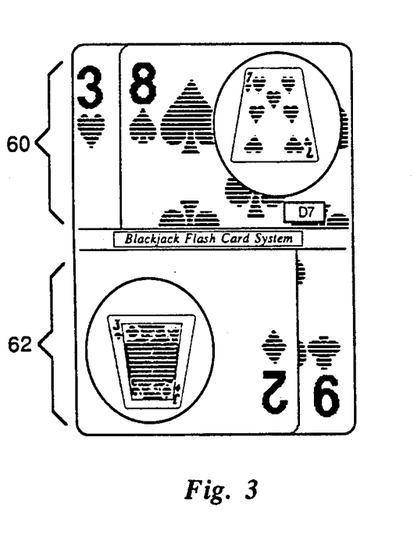
FIGS. 3 through 6 show the fronts and backs of additional examples of flash cards for blackjack.
Figure 4:
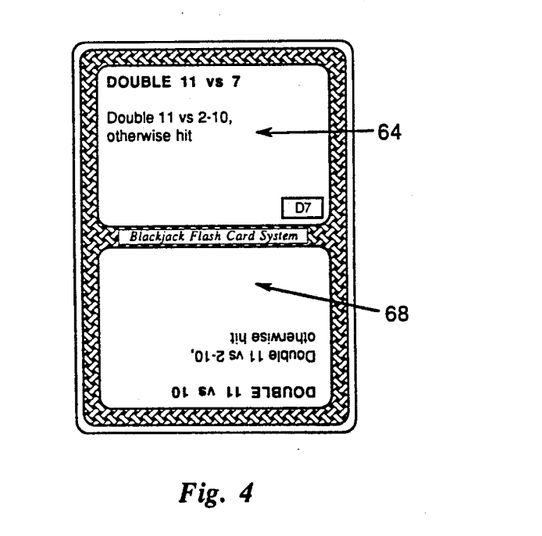

A typical embodiment of the present invention is a flash card illustrated in FIGS. 1 and 2. The flash card shown is one of a set of flash cards intended to be used for the teaching and practicing of the game of blackjack. The flash card is the size, shape and weight of a standard "poker-sized" card used for playing card games in casinos. The front of the flash card, as illustrated in FIG. 1, has two main sections, 10 and 23, printed in opposing orientation, one at each end of the flash card. Each section portrays a player's blackjack hand consisting of two or more playing cards, and the dealer's up card, which is the card the dealer turns up on the table in front of the player in a game of blackjack. Each end of the front of the flash card therefore displays a combination of cards which represents a combination of playing cards that could occur during the process of playing a game of blackjack at a blackjack table in a casino.

The player's hand appears as overlapping images of portions of playing cards. A first card portion 11 appears at the upper-leftmost edge of the front of the flash card. A second card portion 12 appears to overlap the first one, partially obscuring it. A line 13 which simulates the edge of the second card portion separates the images of the playing cards. The two portions of playing cards thus simulate two playing cards held in a player's hand facing the player and spread so as to reveal the rank and suit pips in the corners of the cards.

Superimposed on the portions of the playing cards is an ellipse 14, which represents a frame or window, inside of which appears a smaller playing card 16 in perspective, which represents the dealer's up card. This depiction of the dealer's card in a frame simulates the appearance of a card viewed in perspective at a distance, as the dealer's card actually appears from the player's viewpoint at the blackjack table.

On the upper section 10 of the flash card there is also printed an identifier 18, consisting of a letter, a number, a combination of both, or any other symbols, in an optional box. This identifier indicates the operational group to which the card belongs and also its sequence within the group.

More than two player's cards can be depicted, as shown in a lower section 23 of the flash card. In use, the flash card would be turned end-for-end to view the lower section, so that it be visible at the top. In this section of the flash card, a third playing card 28 also appears, overlapping a second card 26 and a first card 24. An elliptical frame 30 and a dealer's card 32 also appears, in a similar manner to the upper section 10.

The front of the card also has a central region 20 available for information unrelated to the operation of the flash card, such as a manufacturer's logo 22 or copyright.

Though the illustration does not denote color, the playing card images would be printed in the colors appropriate for their suits or ranks, such as red for hearts, black for spades, and multicolor for the royal design of face cards. In addition, the identifier is colored according to the group to which the flash card belongs.

The back of the flash card, as illustrated in FIG. 2, has two main sections 40 and 50. They are superimposed on a decorative design 52 which simulates the design on the back of a common playing card used in casinos. The section on each end of the back contains written information telling the player what to do when challenged with the situation presented in the corresponding section printed on the proximate end of the front. Thus, the words in the back section 40 provide the action to take in the situation presented in the front section 10.

Each main section on the back has two mandatory information parts, a recommended action 42, which is printed prominently and indicates the specific play that must be made in the present situation, and a governing rule 44, which is the playing strategy rule applicable to the situation. Like the sections on the front, a section on the back is right-side up and in its normal position for use when the words printed on it are right-side up. Enough space remains in each section to print additional information which applies to the situation, if necessary.

Like the front of the flash card, the back also has an identifier 46 and enough additional area to print a manufacturer's logo 46.

Figure 5:
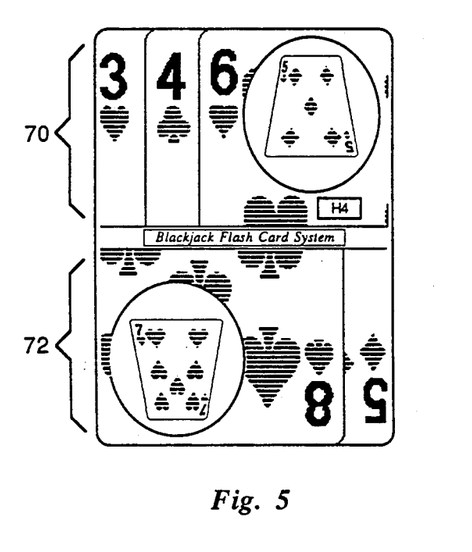
Figure 6:
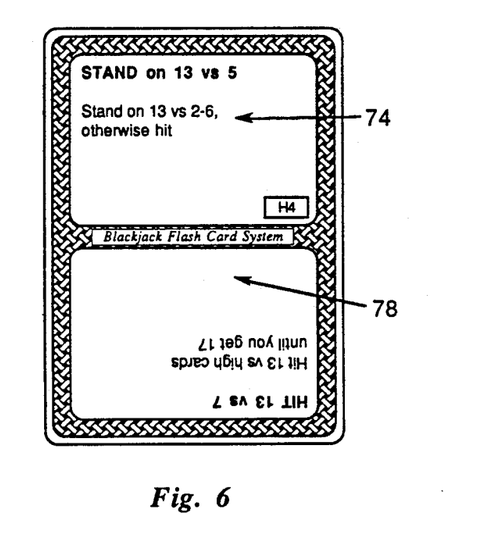

FIGS. 3 through 6 present other examples of this embodiment of the invention. Though in theory any combination of cards and situations could be printed on each end of the front of the flash cards, the examples in FIGS. 1 through 6 indicate how in practice the two situations on each card are similar in subject matter. For example, in FIG. 3, two sections 60 and 62 each present a player's hand which adds up to a total of 11. However, the dealer's up card is different in each section. On the back side of the flash card in FIG. 4, the recommended actions in sections 64 and 68 are the same, i.e. "DOUBLE", and the governing rules are identical. In FIG. 5, two sections 70 and 72 present a slightly more complex combination, with related but diverging actions and rules indicated on the back of the flash card in FIG. 6. Finally, the situations originally presented in FIGS. 1 and 2 portray an even more divergent example.

OPERATION OF INVENTION

The primary manner of using the present invention is self evident from inspection of the figures and reading of the description above. To use each flash card, the user looks at the top half of the front of the card which depicts a playing situation in the game of blackjack. The two or more cards portions 11 and 12 in FIG. 1, visible in the upper-left-hand corner of the card, comprise a player's hand, and the smaller card in perspective in the elliptical frame represent the dealer's up card. The user attempts to remember what action to take, and turns the card over to view the recommended action and rules in the corresponding section 40 on the back of the card.

In actual practice, the flash card is intended to be part of a product which includes an instruction manual and a deck of 54 cards. Nine of the cards are printed with rules and instructions, and 45 are flash cards of the design of the present invention as exemplified in FIGS. 1 through 6. The size, shape, and quantity of the cards is intended to resemble a deck of common "poker" playing cards used in a casino, which has 52 playing cards and two jokers. The flash cards are divided into logical groups, as indicated by the letter in each card's identifier 18, and each card's sequence in that group is indicated by the number in the identifier. There are three groups, consistent with the three types of situations that can arise in blackjack: (1) hit-stand, (2) double-down, or (3) pair.

The optimal way to use the product is first to read and study the instruction manual, which describes various aspects of the game of blackjack, the casino environment, and, most importantly, the rules which govern what play to make in each situation. Then, the user continues to learn, employing the flash cards to practice the rules that have been studied. Through the use of the cards, the recollection of what action to take in each situation becomes automatic and instantaneous.

The proficient blackjack player must be able to make decisions instantaneously, without hesitation for interpretation or translation. Therefore, it is an important feature of the present invention that the situation on the front of the card is depicted as a true-to-life representation of a blackjack playing situation. We feel that this aspect of the invention significantly improves its effectiveness. The user does not have to go through a process of translating written questions, letters, numbers, or any other inferior representation of the situation at hand. Instead, with this invention, he sees images which are as close as possible to the appearance of the actual situation. We feel that this accelerates the learning process, and the user's enjoyment of it.

The flash cards are packaged in order by group and sequence. The user separates the cards in the first group, eight hit-stand cards, from the rest of the deck. He views the upper section of each card in sequence, responding to the question posed by the situation depicted on the card, turns the card over to confirm the answer, repeats the governing rule out loud, and places the card on the bottom of the stack of cards in this group. This process is repeated until the top section each card cards in this group has been viewed. Then the stack is inverted, end-for-end, so that the situations on the lower sections are visible at the top of the cards, and repeats the drill. Upon reaching the end of the group, the stack is inverted again, and the process is repeated.

When the user feels that he knows the answers to all the situations, he shuffles the stack of cards in the group. The symmetrical nature of the cards allows ease of shuffling, similar to deck of common playing cards. Then the drill is repeated, but now the situations will be presented in a completely new and random sequence.

The user repeats the process with each of the two other groups of cards. Finally, all the cards are shuffled together for a drill including all the situations on all the cards. It is an important aspect of the present invention that the flash cards can easily be shuffled. Such shuffling produces a new random ordering of the situations presented to the user. Because of the fact that two situations are presented on each card, the number of possible permutations of orders of situations presented is much greater than would normally be available with a set of flash cards that had only one situation or question per card.

Figure 9:
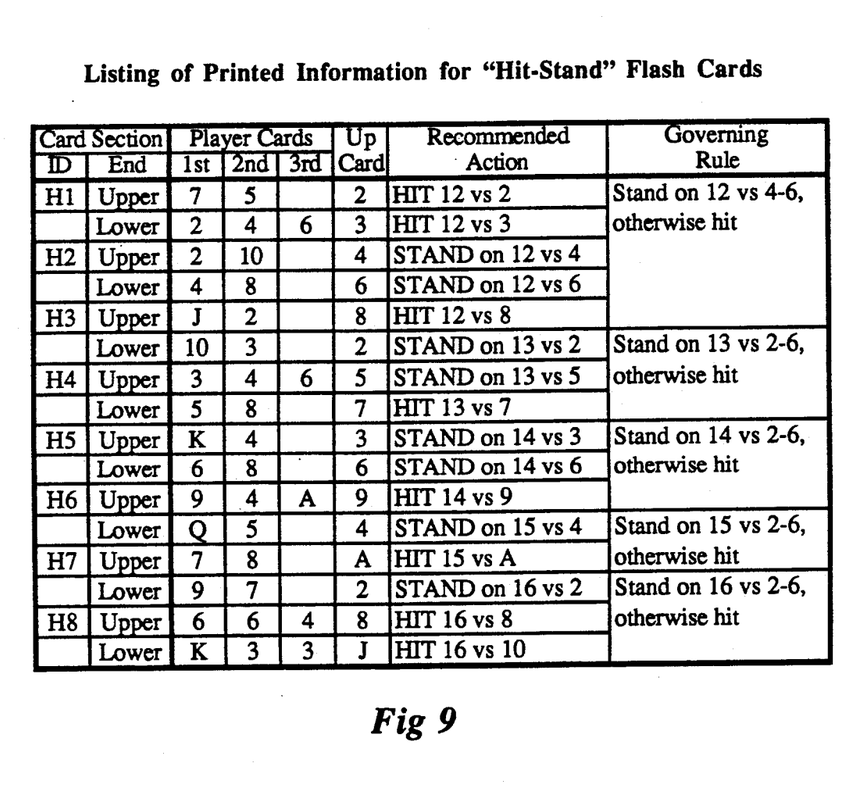
Figure 11:
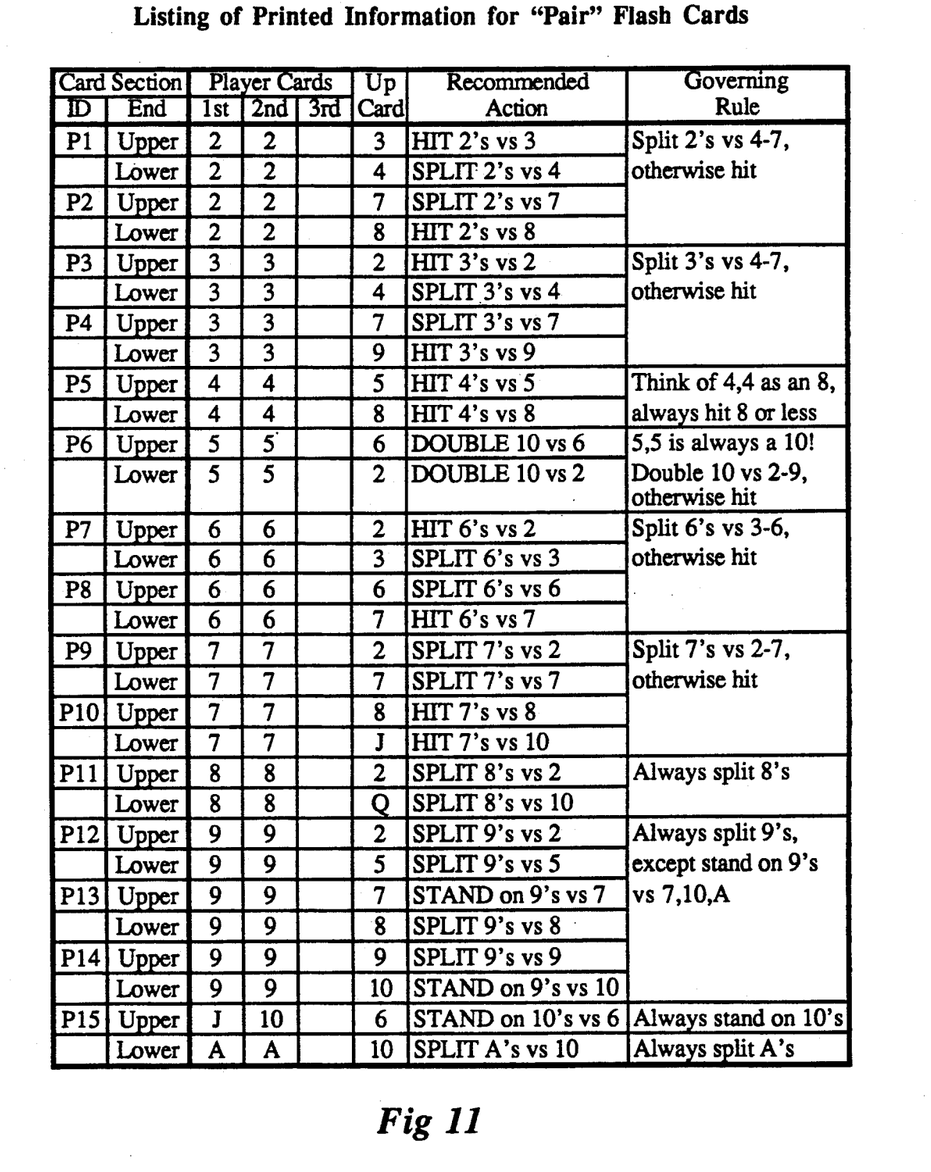

In the preferred embodiment whose operation has been described here, the flash cards are printed as described in the charts in FIGS. 9, 10 and 11, which list the card values and answer information for hit-stand, double, and pair situations, respectively. No suits have been assigned to the playing card portions on the card, because in the production of the cards, the suits are assigned randomly. Also, on some of the cards, additional information which is not listed in these figures would be printed in available blank space on the back sides, as necessary, to clarify special actions to be taken that may come up during the play of the game. For example, in a game where only one deck of playing cards is being used by the dealer, some of the recommended actions are different.

The recommended actions to be taken and the governing rules are drawn from various sources and are common knowledge in the prior art of blackjack playing strategy. Some publications which discuss these actions and rules have minor differences in the playing strategy, recommended actions, and governing rules. Such differences arise because of the assumptions made when generating the strategy. Examples of such assumptions are the number of decks in play and variations in house rules at a specific casino. Therefore, the actions and rules to be printed on a flash card which is an embodiment of this invention, as well as the specific card situations used, are not limited by the listing in the charts.

A detailed analysis of the listing of flash card information on the charts will reveal that there are significantly fewer situations listed than the greater than 250 situations possible with two player cards and one dealer up card, or the substantially greater number if three or more player cards are used. We feel that the 90 situations listed summarize in an efficient manner the necessary actions and rules to be learned, provide sufficient opportunity to list other additional information in the extra space allowed, and provide sufficient practice of unique two- and three-card combinations for the player to learn how to play according to a basic strategy for the game of blackjack. Simultaneously, the number of cards needed is limited to a manageable number which can fit in a box the same size as a standard deck of cards, thus providing a marketable entity. The number of cards is reduced by eliminating the presence of redundant situations whose answers will become apparent to the user after a moderate amount of practice. For instance, a user will quickly realize that he must "STAND on 14 vs 5" even though that situation is not specifically shown on any card, because flash card H5 depicts similar situations and states a governing rule which applies.

Embodiments of the present invention are not limited to the embodiment so far described. Flash cards for a variety of blackjack playing strategies could be implemented using the present invention. An example is counting strategy such as the one described by Ken Uston in his book *Million Dollar Blackjack* previously cited. The recommended actions and governing rules are more numerous and complicated, but could easily be summarized on a set of flash cards pursuant to the descriptions of the present invention.

In addition, the present invention could be used as a basis for a game wherein players would be tested for and achieve scores by their knowledge of blackjack, thereby using the attributes of the improved pictorial representations as a part of the game. The format of the present invention could also be used in the form of a book to achieve the same result. The pages could not be shuffled, but a large number of situations could easily fit in a book. Depending on how the situations and answers were arranged on the pages, the book could either be read upside-down or backwards to reveal a second set of flash card situations.

CONCLUSIONS, RAMIFICATIONS, AND SCOPE OF INVENTION

Accordingly, the reader will see that the flash cards of the present invention provide a more effective, more enjoyable, and easier-to-use method for teaching and practicing blackjack than has been supplied heretofore. The design of the printing on the cards dramatically increases the rate of comprehension of the situations and questions being posed. It also more accurately simulates the playing of the game itself, and therefore the person learning with the flash cards will be able more easily to move from the training tool to the actual game. The non-directional nature of the flash cards enhances the ability of the cards to be shuffled, and increases the randomness of the mix created by shuffling. Furthermore, a proper embodiment of the features of the invention also provide additional advantages in that:

(1) the identifying number and letters allow the deck to be sorted easily for use by new users;
(2) the number of cards needed to present the necessary information is reduced to an extent that the deck of cards is the same size and shape as a standard deck of poker-sized playing cards;
(3) sufficient additional space is available to include extra material to be taught, as well as a manufacturer's logo or trademark without damaging the effectiveness of the flash card; and
(4) special circumstances in the game, such as specific combinations of cards which may be more difficult to analyze, may be easily implemented for presentation to the user.

Although the description above contains many specificities, these should not be construed as limiting the scope of the invention but merely providing illustrations of some of the presently preferred embodiments of this invention. Thus the scope of the invention should be be determined by the appended claims and their legal equivalents, rather than by the examples given.

We claim:
1. A flash card for teaching or practicing the game of blackjack, comprising:
 (a) a representation of a playing situation printed on the front side of said flash card, comprising:
  (i) a plurality of images of portions of playing cards, arranged to look like cards held in a player's hand, printed on the front of said flash card, and
  (ii) an image of a playing card which depicts the dealer's up card, superimposed on said plurality of images; and
 (b) a recommended playing action for said situation printed on the back side of said flash card.
2. The flash card of claim 1 wherein said representation is printed on each opposing end of the front side of said flash card, and said recommended playing action is printed on each opposing end of the back side of said flash card, in a manner providing a means for reversing the end-for-end orientation of said card without affecting its operation.

3. The flash card of claim 2 wherein said representations printed on the opposing ends of the front of said flash card portray two differing playing situations, and said recommended playing actions printed on the back of said flash card present the appropriate recommended playing actions for said differeing situations on the front.

4. The flash card of claim 1 including a means for framing said image of a playing card which depicts the dealer's up card for the purpose of highlighting said image.

5. The flash card of claim 1 wherein said image of a playing card which depicts the dealer's up card is shown in perspective as if seen from the player's viewpoint.

6. The flash card of claim 1 including a plurality of said flash cards, said plurality providing a multitude of playing situations and recommended playing actions.

7. In a flash card comprising a question or a plurality of questions printed on one side and an answer or plurality of answers on a reverse side, wherein said questions and respective said answers appear in sections printed on opposing ends of said card, thereby providing a means for reversing the orientation of said card without losing its effectiveness, the improvement wherein
  (a) each said question is composed of one or more representations of a playing situation in the game of blackjack, comprising:
    (i) a plurality of images of portions of playing cards, arranged to look like cards held in a player's hand, and
    (ii) an image of a playing card depicting the dealer's up card, superimposed on said plurality of images; and
  (b) each said answer comprises a recommended playing action for the respective said situation.

8. The flash card of claim 7 including a means for framing said image of a playing card which depicts the dealer's up card for the purpose of highlighting said image.

9. The flash card of claim 7 wherein said image of a playing card depicting the dealer's up card is shown in perspective as if seen from the player's viewpoint.

10. The flash card of claim 7 wherein the questions on one end of said flash card are different from the questions on the opposing end of said flash card, and the answers printed on the back of said flash card present the appropriate answers for said differing questions on the front.

11. The flash card of claim 7 including a plurality of said flash cards, said plurality providing a multitude of questions and answers.

* * * * *